Nov. 13, 1928.  1,691,680
T. J. THOMPSON
LINK FOR USE IN COAL CUTTING MACHINES AND THE LIKE
Filed Jan. 21, 1928
Fig:1.
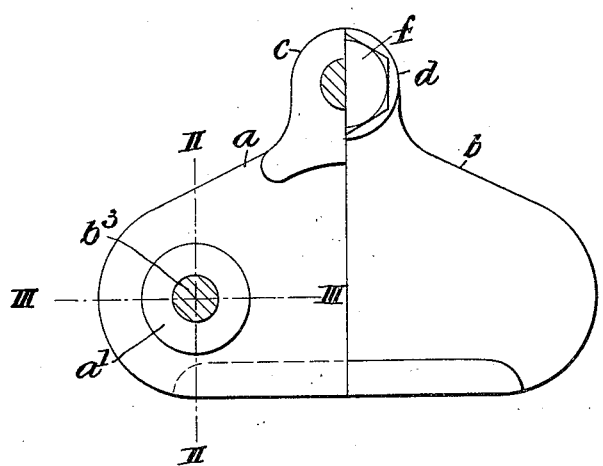
Fig:2.
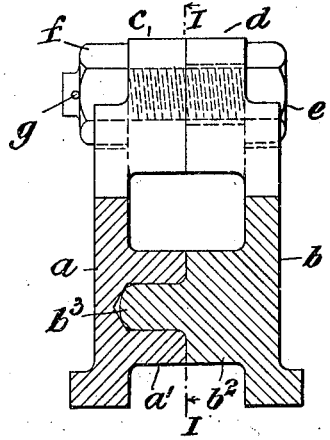
Fig:3.
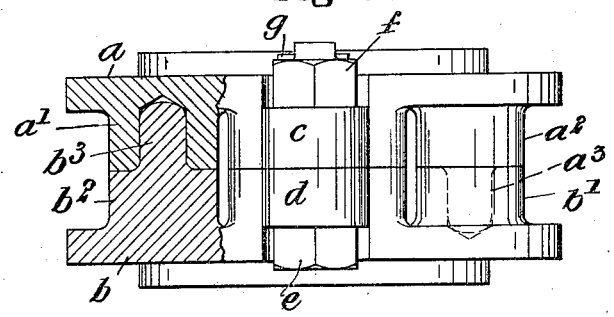
Fig:4.
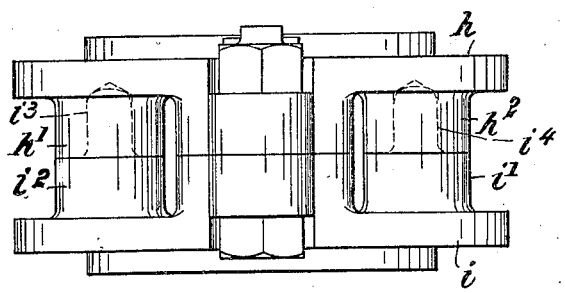
Inventor:
Thomas Johnson Thompson.
by his Attorney.

Patented Nov. 13, 1928.

1,691,680

UNITED STATES PATENT OFFICE.

THOMAS JOHNSON THOMPSON, OF SUNDERLAND, ENGLAND.

LINK FOR USE IN COAL-CUTTING MACHINES AND THE LIKE.

Application filed January 21, 1928, Serial No. 248,427, and in Great Britain December 6, 1926.

This invention relates to links for use in coal cutting machines and the like of the kind in which the link is bipartite and comprises two complementary side members with complementary bosses on each side member for engaging the bearing surfaces of the cutter boxes, and has for its object to provide a link which may be readily connected to and disconnected from the cutter boxes or their equivalents.

Heretofore the removal of a link of a coal cutter has involved chipping out of the countersunk rivet heads, an operation which is rendered particularly laborious by the unfavourable working conditions at the coal face.

A link constructed according to the present invention comprises essentially the two complementary side plates of the link, a pair of bosses on the sides of each side plate, dowel pins rigid with two of the bosses, and recesses in the other complementary pair of bosses with which said dowel pins are adapted to engage, and means adjacent the outer edges of the side plates for clamping the latter together. Both the bosses on the one link member may have the dowel pins projecting therefrom, the bosses on the other link member being recessed to receive the dowels, or of the two bosses on each link member one may be provided with a dowel and the other with recesses.

The invention is illustrated in the accompanying drawing, in which:—

Fig. 1 is a side elevation partly in section of one form of link, the section being taken on the line I—I of Fig. 2.

Fig. 2 is an end elevation partly in section, the section being taken on the line II—II of Fig. 1.

Fig. 3 is a plan view partly in section, the section being taken on the line III—III of Fig. 1, and Fig. 4 is a plan view of an alternative construction.

Referring to the construction shown in Figs. 1 to 3, the link comprises two link plates or members $a$, $b$, having bosses $a^1$, $a^2$, $b^1$, $b^2$, formed thereon. The bosses $a^2$, $b^2$ have dowels $a^3$, $b^3$ projecting therefrom which engage into recesses formed in the bosses $a^1$, $b^1$, the dowels being preferably tapered as shown to ensure easy entrance into the corresponding recesses. Midway along the outer edges of the link members two L-shaped lugs $c$, $d$ are formed, one on each link member, which lugs project outwards, from the link members relatively to the sprocket centres, but extend inwardly between the two link members so that a bolt $e$ may be passed therethrough and locked by a nut $f$ and split pin $g$ or the equivalent, leaving the bolt and nut flush with, or inwards of, the outer side faces of the link members.

It will be seen that by simply tightening up the nut $f$ on the bolt $e$ the two link members $a$, $b$ will be drawn hard up against each other, while by slackening off the nut the two members may be drawn apart and the link removed from the coal cutter, operations which occupy a comparatively insignificant period of time.

By forming a dowel on one only of the bosses on each link member, and recessing the other boss as above described and shown, each link member is identical, so that the actual manufacture of the link with this construction will involve the making of one pattern of link member only, two of such members forming the complete link.

The construction according to Fig. 4 is the same as that described with reference to Figs. 1 to 3 with the exception that both bosses of one link member are recessed, while both bosses of the other link member are provided with dowels. $h$ designates one link member having two recessed bosses $h^1$, $h^2$. $i$ designates the other link member having bosses $i^1$, $i^2$ presenting dowels $i^3$, $i^4$ projecting into the recessed bosses $h^1$, $h^2$.

What I claim as my invention and desire to secure by Letters Patent of the United States is:—

1. A link of the kind described comprising two complementary side plates, each plate having two bosses on one side thereof, dowel pins projecting from two of the bosses and recesses in the other complementary bosses into which said dowel pins are adapted to engage, a lug on each side plate adjacent the outer edge thereof, and means for clamping said lugs together.

2. A link of the kind described comprising two complementary side plates, each plate having two bosses on one side thereof, dowel pins projecting from two of the bosses and recesses in the other complementary bosses into which said dowel pins are adapted to engage, an L-shaped lug on each plate arranged midway along the outer edges of the plate, and means for clamping said lugs together.

In witness whereof I have signed this specification.

THOMAS JOHNSON THOMPSON.